United States Patent
Reynolds

(10) Patent No.: US 12,292,561 B2
(45) Date of Patent: May 6, 2025

(54) COMPACT, HAND-HELD, PORTABLE, STABLE MONOCULAR

(71) Applicant: Brian Reynolds, Torrance, CA (US)

(72) Inventor: Brian Reynolds, Torrance, CA (US)

( * ) Notice: Subject to any disclaimer, the term of this patent is extended or adjusted under 35 U.S.C. 154(b) by 560 days.

(21) Appl. No.: 17/686,655

(22) Filed: Mar. 4, 2022

(65) Prior Publication Data
US 2022/0291498 A1   Sep. 15, 2022

Related U.S. Application Data

(60) Provisional application No. 63/159,561, filed on Mar. 11, 2021.

(51) Int. Cl.
*G02B 23/02* (2006.01)
*G02B 23/16* (2006.01)

(52) U.S. Cl.
CPC ............. *G02B 23/02* (2013.01); *G02B 23/16* (2013.01)

(58) Field of Classification Search
CPC .......... G02B 23/02; G02B 23/16; G02B 7/00; G02B 7/002; G02B 23/00; G02B 23/06; G02B 23/08; G02B 23/105; G02B 23/18; G02B 23/22; F41G 1/34; F41G 1/00; F41G 1/38; F41G 1/40
USPC ....... 359/399, 362, 363, 400, 402, 405, 406, 359/407, 408, 409, 422, 423, 425, 426, 359/431, 432, 503, 506; 42/111, 118, 42/119, 148
See application file for complete search history.

(56) References Cited

U.S. PATENT DOCUMENTS

| | | | | |
|---|---|---|---|---|
| 546,871 | A | * | 9/1895 | Abbe ..................... G02B 23/02 359/404 |
| 1,649,303 | A | * | 11/1927 | Glessner ................ G02B 23/00 359/414 |
| 2,135,531 | A | | 11/1938 | Reichert |
| 2,492,353 | A | | 12/1949 | Brackett |
| 3,913,116 | A | * | 10/1975 | Kastner .................. G03B 19/18 396/383 |
| 4,580,886 | A | | 4/1986 | Hajnal |
| 4,911,673 | A | | 3/1990 | Hollowell |
| 5,321,547 | A | | 6/1994 | Zapp |
| 6,311,424 | B1 | * | 11/2001 | Burke ....................... F41G 1/40 89/203 |
| 9,429,392 | B1 | * | 8/2016 | Ledbetter ................. F41G 1/35 |
| 2004/0136062 | A1 | | 7/2004 | Farkash |
| 2017/0168319 | A1 | | 6/2017 | Reynolds |

* cited by examiner

*Primary Examiner* — Arnel C Lavarias
(74) *Attorney, Agent, or Firm* — Hudak, Shunk & Farine Co. LPA

(57) ABSTRACT

A compact, hand-held monocular device having excellent stability in view of its construction which allows the device to be held against the side of the head of the user. The device is of unitary construction, without assembly of multiple parts necessary, and can be manipulated between an active, in-use configuration which allows one-handed operation, and a storage configuration wherein the device folds flat, allows protection of the optics and storage in a small space such as a pocket or purse or hung on a neck lanyard.

20 Claims, 7 Drawing Sheets

COMPACT, HAND-HELD, PORTABLE, STABLE MONOCULAR

FIELD OF THE INVENTION

The present invention relates to a compact, hand-held monocular device having excellent stability in view of its construction which allows the device to be held against the side of the head of the user. The device is of unitary construction, making assembly using multiple parts unnecessary. The device can be manipulated between an active, in-use configuration which allows one-handed operation, and a storage configuration wherein the device folds flat, which allows protection of the optics and storage in a small space such as a pocket or purse or even worn around a user's neck on a lanyard.

BACKGROUND OF THE INVENTION

The use of optical instruments for observation is well known in the art. Devices such as binoculars, monoculars, periscopes and telescopes are designed to magnify an image so that a distant object can be studied in greater detail. Magnification allows an observer to study objects, images and/or events at a distance. Devices designed to be utilized with both eyes, such as binoculars are often large in size thus making them not easily storable. Binoculars can be difficult to utilize one-handed as well.

Various monoculars, periscopes and telescopes are designed to be held in front of an eye and extend away from the body, thus creating balance issues which can lead to shaking and blurring of an object or image.

U.S. Pat. No. 10,895,760 relates to a hands-free binocular device. A pair of eyeglasses has two temples. A telescopic section is mounted to each eyeglass temple. The hands-free binocular device includes lenses for magnifying images and light path redirecting devices for controlling the light path to the eyeglass lenses. Light from an image being observed flows through the magnifying lenses and is redirected by the light path redirecting device. The image is magnified and viewable by a user. The user can shift his gaze upward to view the magnified image or look down from the magnified image to view a non-magnified image.

U.S. Publication No. 2004/0136062 relates to a portable periscope that comprises a periscope head, a periscope barrel and a periscope elbow. The periscope barrel is made up of a plurality of segments that can be disassembled for transport and assembled for use. The segments are either separated from each other or are joined by hinges, making a foldable articulated periscope.

U.S. Pat. No. 5,321,547 relates to a monocular telescope in which the beam path is so laid out that the casing may be flat in the direction of view, and the optical axis of the beam path in the casing describes a somewhat rectangular route, and in which the telescope has a view finder beam path intersecting with the telescope beam path in the user's eye.

U.S. Pat. No. 4,911,673 relates to a toy viewing assembly kit for producing multi-directional image reflecting configurations. The kit is comprised of a plurality of angular reflecting sections having reflecting elements disposed therein and hollow extension sections. The individual sections having coupling portions for permitting removable interconnection thereof. The coupling portions allowing unrestricted axial rotations of adjacently connected sections thereby creating multi-directional assembly configurations. The assembly configurations provide multi-axis image reflections viewable by the child user.

U.S. Pat. No. 4,580,886 relates to a snorkel camera system that has a prime lens connected to one end of the housing and a camera body connected to the other end of the housing, the optical axis of the prime lens and of the camera body being offset and parallel, and the housing is detachably mounted to the camera body such that the housing can be rotated about the camera body to a desired position and locked in place, the optical system being such that the image seen in the viewfinder maintains the correct attitude regardless of the position to which the prime lens is rotated.

U.S. Pat. No. 2,492,353 relates to optical instruments and, more particularly, to periscopes providing a dual sight of high and unit power. The invention is particularly applicable to periscopes of the type utilized in combat vehicles such as tanks.

U.S. Pat. No. 2,135,531 relates to optical instruments and more particularly to the type which employs a system of lenses which invert the image, and in which it is therefore necessary to employ an inverting system to erect the image, and more particularly to an inverting system which employs reflecting surfaces.

In view of the above, the art still needs a stable, hand-held optical device.

SUMMARY OF THE INVENTION

The above noted problems and others are solved with the hand-held monocular device of the present invention which provides crisp, clear imaging that is stable and relatively jitter-free even though the device is hand-held. The device is especially configured so that a main body thereof can be held against the side of the user's head. In an advantageous embodiment, the device is able to be converted from an active, in-use configuration to a closed configuration which allows the device to be stored in small spaces such as a pocket or purse or worn around the neck using a lanyard. In the storage configuration, the objective optical element and eyepiece of the device are protected and covered which avoids dust and/or other debris buildup thereon.

In still a further embodiment, the monocular device is configured to record and/or store objects or images viewed thereby, with the device including a processor, preferably comprising memory storage.

In yet another embodiment, the device includes hardware and/or software that allows transmission of images viewed by the device to another device, for example utilizing a wireless connection such as WI-FI™ or BLUETOOTH™.

Advantageously, the device of the present invention can incorporate one or more of night vision imaging, infrared imaging, laser range-finding capabilities, augmented reality and telepresence.

In one aspect a portable monocular device is disclosed, comprising a main body including an objective optical element located on a front end of the main body that gathers light from an object, the main body having a length between the objective optical element and a rear end of the main body, and a viewing arm having first, body end and a second, eyepiece end opposite the first end that includes an eyepiece, wherein the viewing arm is rotatably connected to the front end of the main body, wherein the viewing arm first end rotates about an axis parallel to a viewing axis of the objective optical element.

In a further aspect, the viewing arm first end rotates about an axis parallel to a viewing axis of the objective optical element.

In an additional aspect, the viewing arm first end extends outwardly away from the front end of the main body and terminates at a front end that is connected to a first end of a lateral extension piece, wherein a second end of the lateral extension piece is connected to the eyepiece.

In still another aspect, the eyepiece end includes a cap surrounding the eyepiece, wherein the cap is flexible or rigid.

In a further aspect, the eyepiece extends rearwardly from the lateral extension piece.

In an additional aspect, the main body includes a pair of light-directing tubes disposed substantially parallel to each other and the viewing axis, wherein a lower tube of the light-directing tubes is connected at a front end thereof to the viewing arm first end.

In still another aspect, wherein the pair of light-directing tubes are optically connected by an intermediate tube.

In a further aspect, the pair of light-directing tubes each include front ends that are joined at a distance by spacer element.

In an additional aspect, the objective optical element is located further back from the front side of the device measured along the viewing axis as compared to the eyepiece.

In still another aspect, the device includes a magnifier for adjusting magnification of the object that can be observed therewith.

In a further aspect, the device has a focus element.

In an additional aspect, the device includes a processor that is able to one or more of 1) record an image, such as a picture or video, of an object viewed by the device and 2) transmit the image to another device.

In still another aspect, the device includes a plurality of lenses.

In a further aspect, the objective optical element comprises a digital sensor that transmits an image viewed by the device to the eyepiece.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
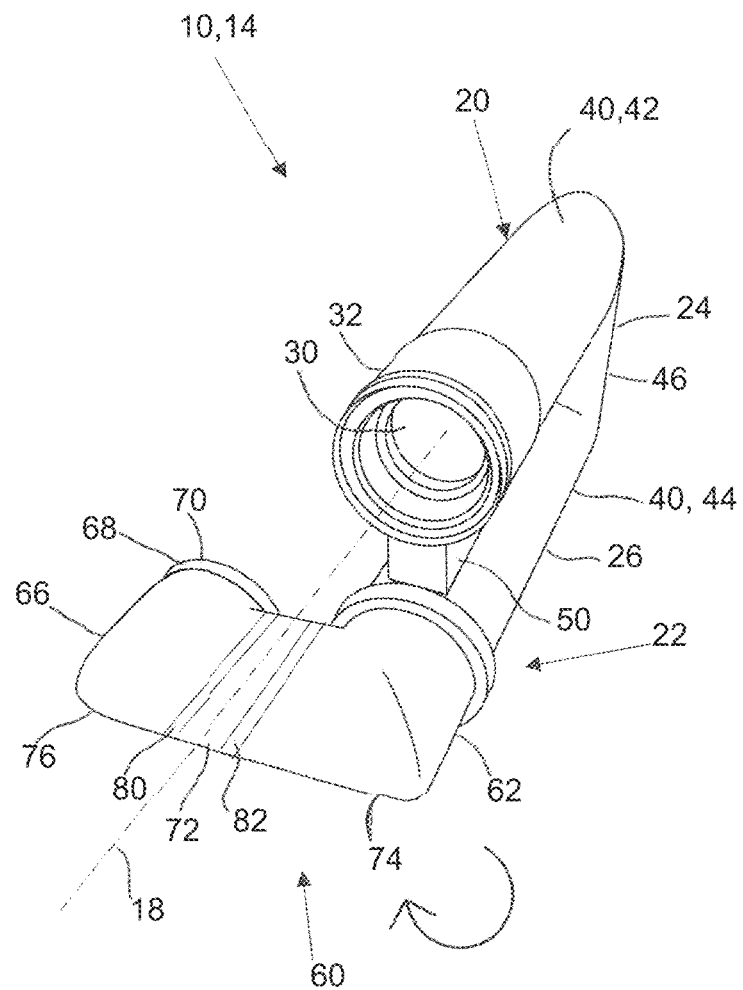
FIG. 1 is a perspective view showing one embodiment of a hand-held monocular device of the present invention in an active, in-use configuration.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to the drawings, wherein the same or similar parts are shown utilizing identical reference numerals throughout the several views. FIG. 1 shows one embodiment of a hand-held monocular device 10 in an active configuration 14 whereby the device can be utilized to view objects, images or the like Device 10 includes a main body 20 generally having a front end 22 adapted to be pointed towards the object or image to be viewed and an opposite, rear end 24 generally at the back or rear of device 10. Device 10 main body 20 has a pair of sides 26 located between the front end 22 and rear end 24.

An objective optical element 30 is disposed at the front end 22 of main body 20. The objective optical element 30 gathers light received from the object or image and transmits the same to the eyepiece described further hereinbelow. A pair of light directing tubes 40 form part of main body 20 and include upper tube 42 and lower tube 44. Intermediate tube 46 connects upper tube 42 with lower tube 44.

The housing of main body 20 includes spacer element 50 which generally secures at directing tubes 40 substantially parallel to each other and parallel to viewing axis 18. As shown in FIG. 1, viewing axis 18 and the longitudinal axis of upper tube 42 are coextensive along the length of the upper tube 42.

Figure 2:
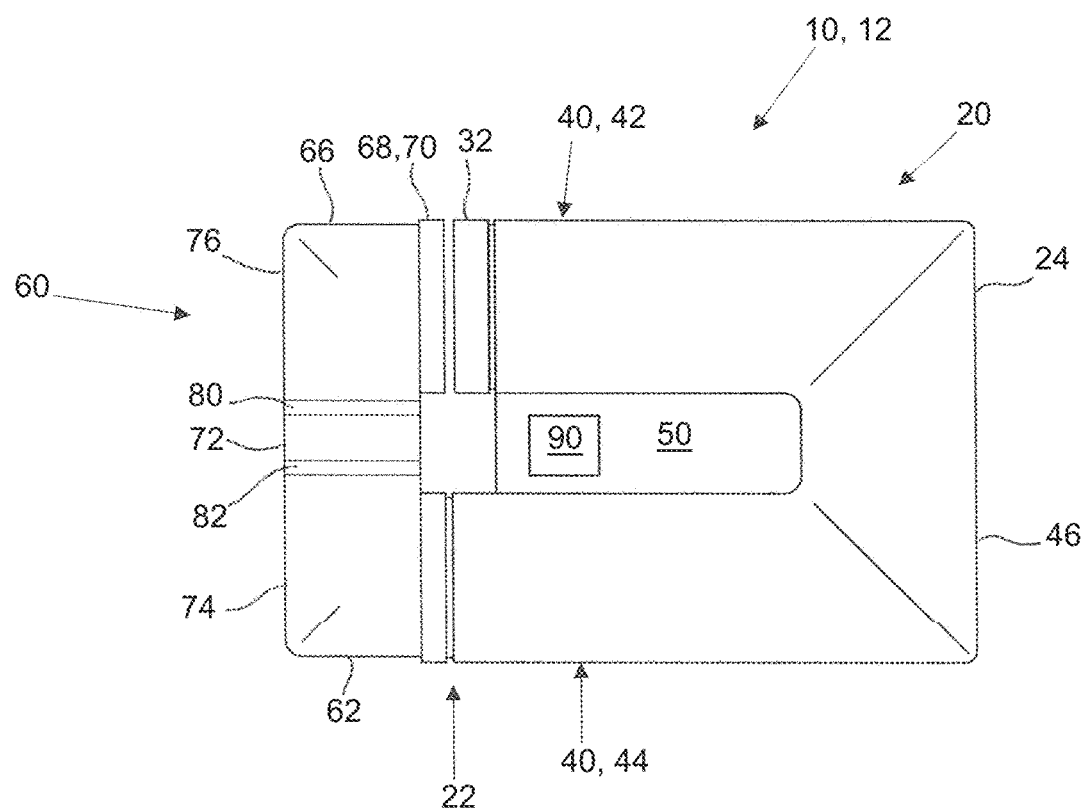
FIG. 2 is the device of claim 1 shown in a storage configuration.
Figure 3A:
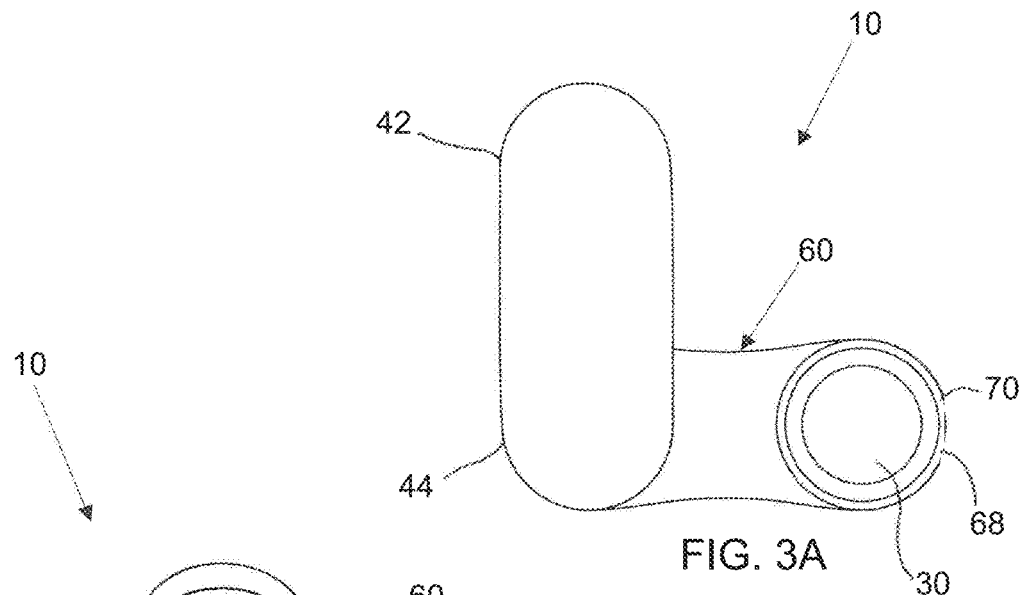
FIG. 3A is a rear view of the device.
Figure 3B:
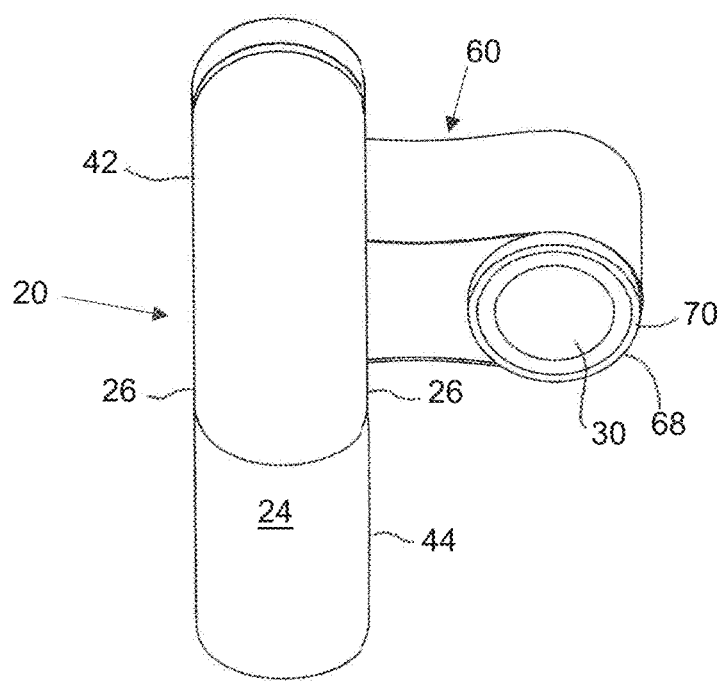
FIG. 3B is a downward looking rear view of the device.
Figure 4:
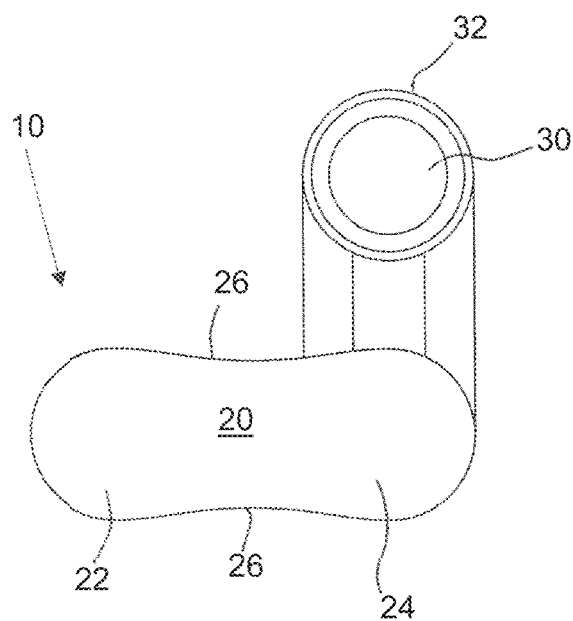
FIG. 4 is a front view of the device.
Figure 5:
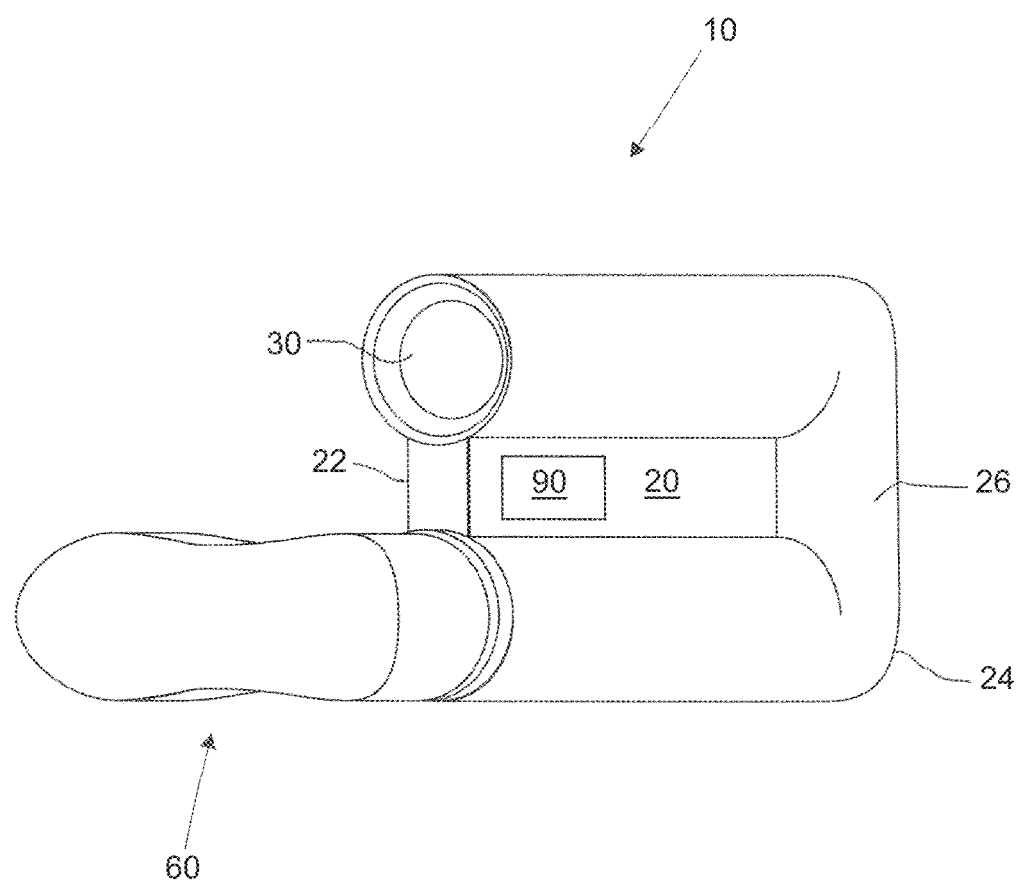
FIG. 5 is a further perspective view of the device.

Viewing arm 60 has a first end 62 having a rear portion that is rotatably connected to main body 20, specifically the front end of lower tube 44, allowing rotation between the active configuration 14 shown in FIG. 1 to the storage configuration 12 shown in FIG. 2. In the storage configuration 12, the eyepiece 68 is aligned with and faces the objective optical element 30. Cap 70 of eyepiece 68 in the closed configuration covers the objective optical element 30. The closed configuration seals out dust and other debris from eyepiece 68 and objective optical element 30.

In a preferred embodiment, as illustrated in FIGS. 1 and 2, the device includes a spring loaded collar 32 connected to main body 20 in the area of the objective optical element 30. Spring loaded collar 32 is moveable on an axis parallel to viewing axis 18 and can be slid over the eyepiece 68 in the closed configuration, thereby sealing the optics from damage. In a preferred embodiment, the spring of the spring loaded collar 30 biases the collar towards front end 22 of main body 20.

The viewing arm body end or first end 62 is connected to the eyepiece or second end 66 via lateral extension piece 72. The first end 74 of lateral extension piece 72 is connected to body end or first end 62 and second end 76 of lateral extension piece 72 is connected to the eyepiece end 66.

Figure 7:
FIG. 7 is a perspective view showing the device in-use, wherein a user is viewing an image with the device, with the main body thereof being held against the head of the user.

As illustrated in FIG. 1, the eyepiece 68 is located closer to the front of device 10 measured along the viewing axis 18 as compared to the objective optical element 30. This allows the viewing arm 60 to be placed out in front of an eye of a user while allowing the device 10 main body 20 to be held against the side of the head of the user, for example as illustrated in FIG. 7.

In a preferred embodiment, the device includes a magnifier 80 that can be utilized to change magnification of the image or object being viewed. Magnifier 80 provides the device with the ability to zoom in on an image. Magnifier 80 can be placed in any desired location on device 10.

The device is also preferably provided with a focus element 82 which allows the user to fine tune clarity of the object or image being viewed. Focus element 82 can be located in any suitable location on device 10, if desired.

Device 10 further includes a processor 90 in various embodiments that can record an image or object viewed by the device and/or transmit the image to another device.

Depending upon the intended market of the device, the viewing system can include one or more of a plurality and lenses and a digital sensor that transmits the image viewed by the device to the eyepiece.

Figure 6:
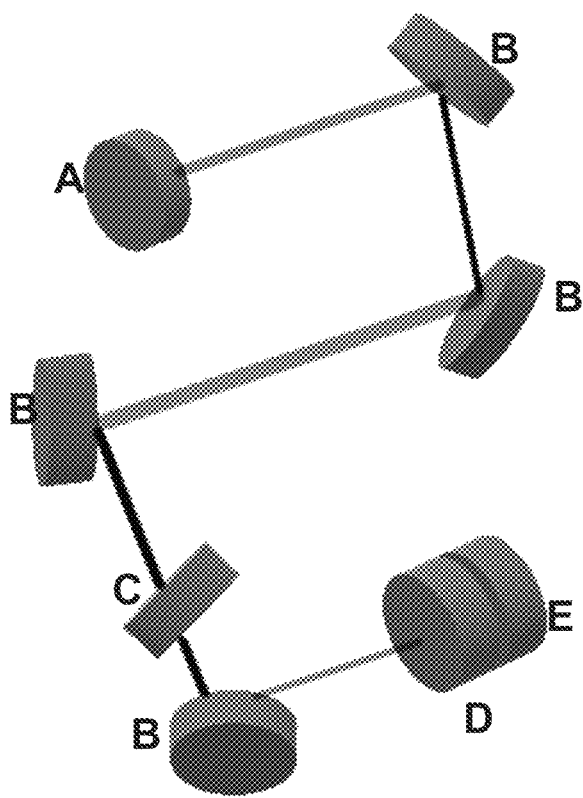
FIG. 6 is a perspective schematic view showing one embodiment of an optical system of the device.

FIG. 6 shows one embodiment of an optical system of the present invention showing a light path from the objective optical element A to eyepiece E. A plurality of deflecting elements B, such as a mirror or prism, are located in the optical path and aid in directing light. Preferably two deflecting elements B are utilized in the main body, in particular at the rear end of the upper light directing tube and lower light directing tube. Two deflecting elements B are preferably utilized in the viewing arm 60, one at first body end 62 and one at second eyepiece end 66. Lens C is also illustrated between adjacent deflecting elements in the viewing arm. A further lens D is also shown adjacent eyepiece E.

In accordance with the patent statutes, the best mode and preferred embodiment have been set forth; the scope of the invention is not limited thereto, but rather by the scope of the attached claims.

What is claimed is:

1. A portable monocular device, comprising:
   a main body including an objective optical element located on a front end of the main body that gathers light from an object, the main body having a length between the objective optical element and a rear end of the main body;
   a viewing arm having first, body end and a second, eyepiece end opposite the first end that includes an eyepiece, wherein the viewing arm is rotatably connected to the front end of the main body, wherein the viewing arm first end rotates about an axis parallel to a viewing axis of the objective optical element; and
   wherein the main body includes a pair of light-directing tubes disposed substantially parallel to each other and the viewing axis, wherein a lower tube of the light-directing tubes is connected at a front end thereof to the viewing arm first end.

2. The device according to claim 1, wherein the viewing arm first end extends outwardly away from the front end of the main body and terminates at a front end that is connected to a first end of a lateral extension piece, wherein a second end of the lateral extension piece is connected to the eyepiece.

3. The device according to claim 2, wherein the eyepiece end includes a cap surrounding the eyepiece, wherein the cap is flexible or rigid.

4. The device according to claim 2, wherein the eyepiece extends rearwardly from the lateral extension piece.

5. The device according to claim 1, wherein the pair of light-directing tubes are optically connected by an intermediate tube.

6. The device according to claim 5, wherein the pair of light-directing tubes each include front ends that are joined at a distance by spacer element.

7. A portable monocular device, comprising:
   a main body including an objective optical element located on a front end of the main body that gathers light from an object, the main body having a length between the objective optical element and a rear end of the main body;
   a viewing arm having first, body end and a second, eyepiece end opposite the first end that includes an eyepiece, wherein the viewing arm is rotatably connected to the front end of the main body, wherein the viewing arm first end rotates about an axis parallel to a viewing axis of the objective optical element;
   wherein the viewing arm first end extends outwardly away from the front end of the main body and terminates at a front end that is connected to a first end of a lateral extension piece, wherein a second end of the lateral extension piece is connected to the eyepiece; and
   wherein the objective optical element is located further back from the front side of the device measured along the viewing axis as compared to the eyepiece.

8. The device according to claim 1, wherein the device includes a magnifier for adjusting magnification of the object that can be observed therewith.

9. The device according to claim 1, wherein the device has a focus element.

10. The device according to claim 1, wherein the device includes a processor that is able to one or more of 1) record an image of the object viewed by the device and 2) transmit the image to another device.

11. The device according to claim 1, wherein the device includes a plurality of lenses.

12. The device according to claim 1, wherein the objective optical element comprises a digital sensor that transmits an image viewed by the device to the eyepiece.

13. The device according to claim 7, wherein the eyepiece end includes a cap surrounding the eyepiece, and wherein the cap is flexible or rigid, and wherein the eyepiece extends rearwardly from the lateral extension piece.

14. The device according to claim 13, wherein the main body includes a pair of light-directing tubes disposed substantially parallel to each other and the viewing axis, wherein a lower tube of the light-directing tubes is connected at a front end thereof to the viewing arm first end.

15. The device according to claim 14, wherein the pair of light-directing tubes are optically connected by an intermediate tube, and wherein the pair of light-directing tubes each include front ends that are joined at a distance by spacer element.

16. The device according to claim 15, wherein the objective optical element is located further back from the front side of the device measured along the viewing axis as compared to the eyepiece.

17. A portable monocular device, comprising:
   a main body including an objective optical element located on a front end of the main body that gathers light from an object, the main body having a length between the objective optical element and a rear end of the main body;

a viewing arm having first, body end and a second, eyepiece end opposite the first end that includes an eyepiece, wherein the viewing arm is rotatably connected to the front end of the main body, wherein the viewing arm first end rotates about an axis parallel to a viewing axis of the objective optical element; and wherein the objective optical element comprises a digital sensor that transmits an image viewed by the device to the eyepiece.

18. The device according to claim 17, wherein the viewing arm first end extends outwardly away from the front end of the main body and terminates at a front end that is connected to a first end of a lateral extension piece, wherein a second end of the lateral extension piece is connected to the eyepiece, and wherein the eyepiece end includes a cap surrounding the eyepiece, wherein the cap is flexible or rigid.

19. The device according to claim 18, wherein the eyepiece extends rearwardly from the lateral extension piece, and wherein the objective optical element is located further back from the front side of the device measured along the viewing axis as compared to the eyepiece.

20. The device according to claim 19, wherein the device includes a magnifier for adjusting magnification of the object that can be observed therewith, and wherein the device has a focus element.

* * * * *